United States Patent [19]

Fishman et al.

[11] E Re. 29,731

[45] Reissued Aug. 15, 1978

[54] METAL OXIDE VOLTAGE-VARIABLE RESISTOR COMPOSITION

[75] Inventors: Herbert Fishman; James S. Kresge, both of Pittsfield, Mass.

[73] Assignee: General Electric Company

[21] Appl. No.: 822,623

[22] Filed: Aug. 8, 1977

Related U.S. Patent Documents

Reissue of:

[64] Patent No.: 3,928,245
Issued: Dec. 23, 1975
Appl. No.: 377,218
Filed: Jul. 9, 1973

[51] Int. Cl.[2] ..... H01B 1/08
[52] U.S. Cl. ..... 252/521; 252/519
[58] Field of Search ..... 252/519, 521

[56] References Cited

U.S. PATENT DOCUMENTS

| | | | |
|---|---|---|---|
| 1,874,785 | 8/1932 | Miller et al. | 252/521 X |
| 2,933,458 | 4/1960 | King et al. | 252/521 |
| 3,052,573 | 9/1962 | Dumesnil | 252/521 X |
| 3,433,749 | 3/1969 | Nishimoto et al. | 252/521 |
| 3,663,458 | 5/1972 | Masuyama et al. | 252/519 X |
| 3,764,566 | 10/1973 | Matsuoka et al. | 252/518 X |
| 3,778,743 | 12/1973 | Matsuoka et al. | 252/518 |
| 3,805,114 | 4/1974 | Matsuoka et al. | 252/518 X |

*Primary Examiner*—Benjamin R. Padgett
*Assistant Examiner*—E. Suzanne Parr
*Attorney, Agent, or Firm*—Francis X. Doyle; Richard A. Menelly

[57] ABSTRACT

A metal oxide resistor of the type consisting essentially of zinc oxide and containing significant amounts of the impurities bismuth trioxide, cobalt trioxide, manganese dioxide, antimony oxide, chromic oxide, and silicon dioxide contains also significant amounts of the impurities barium oxide and boron oxide.

5 Claims, 2 Drawing Figures

METAL OXIDE VOLTAGE-VARIABLE RESISTOR COMPOSITION

Matter enclosed in heavy brackets [ ] appears in the original patent but forms no part of this reissue specification; matter printed in italics indicates the additions made by reissue.

BACKGROUND OF THE INVENTION

The invention relates generally to metal oxide non-linear voltage-variable resistors, and is particularly applicable to, but not limited to, zinc oxide resistors for overvoltage surge protection devices.

Various overvoltage surge protective devices include as an essential element a non-linear voltage-variable resistor. The resistor may be made of silicon carbide, which is commonly used for such a purpose, or it may also be made of a metal oxide composition, such as zinc oxide. Overvoltage surge protection devices and their function are discussed in, for example, the following:

U.S. Pat. Nos.

3,671,800 issued 20 June 1972 to E. W. Stetson
3,586,913 issued 22 June 1971 to A. A. Olsen et al.
2,529,144 issued 7 Nov. 1950 to E. A. Evans et al.

Technical Publications

"Electrical Transmission & Distribution Reference Book" 4th Edition, Westinghouse Electric Corporation, Pittsburgh, Pa. 1950 pp. 621 to 627.

Metal oxide compositions for non-linear resistors are described in some detail in, for example, the following:

U.S. Pat. Nos.

3,689,863 issued 5 Sept. 1972 to Matsuoka et al.
3,670,216 issued 13 June 1972 to Masuyama et al.
3,670,221 issued 13 June 1972 to K. Hamamoto et al.
3,663,458 issued 16 May 1972 to Masuyama et al.
3,642,664 issued 15 Feb. 1972 to T. Masuyama et al.
3,634,337 issued 11 Jan. 1972 to M. Matsuoka et al.
3,632,529 issued 4 Jan. 1972 to M. Matsuoka et al.
3,632,528 issued 4 Jan. 1972 to M. Matsuoka et al.
3,611,073 issued 5 Oct. 1971 to K. Hamamoto et al.
3,598,763 issued 10 Aug. 1971 to M. Matsuoka et al.
3,570,002 issued 24 Apr. 1968 to T. Masuyama et al.
3,503,029 issued 24 Mar. 1970 to M. Matsuoka
3,496,512 issued 17 Feb. 1970 to M. Matsuoka et al.

Technical Publications

Ichonose, Noboru "TNR High Performance Ceramic Varistor Element", in Japan Electronic Engineering, Tokyo Shibaura Electric Company, Ltd, July 1972 pp. 32–36.

"Metal Oxide Varistors For Power-Surge Protection", in Electrical World, Vol. 177, Feb. 1, 1972 p. 109.

"Unique Variable Resistor Bypasses High Voltage Spikes" in Product Engineering, Vol. 43, Feb. 1972 p. 40.

"Defeating Power Surges", in Research & Development Review 1972 by General Electric Company, Corporate Research & Development, Schnectady, New York, pp. 6–7.

While zinc oxide resistors consist substantially of zinc oxide, certain impurities added to the zinc oxide in minute quantities are necessary to give the resistor the characteristics which are desired for a given application. These characteristics are termed the strength, the exponent, and the stability.

The strength of surge arrester valve element is a measure of its ability to resist current channeling in the bulk material under severe loading conditions. The phenomenon by which such channeling occurs is not presently fully understood, and the strength of a given valve element material is thus determined on a relative basis by empirical methods.

The exponent of a valve element material is, in effect, the degree of non-linearity of the resistance relative to the applied voltage. Thus, a high exponent material is more likely to be suitable as surge arrester valve than is a low exponent material, as it will provide a more distinct switching operation.

Stability refers to the ability of the valve element to retain its initial current-voltage characteristics after a period of operation under typical operating conditions.

One composition of zinc oxide which has shown considerable promise as a surge arrester valve material has added to it, in addition to a number of other impurities, some silicon dioxide. The silicon dioxide increases the exponent and the resistance of the material. However, the composition does not have the stability needed to make it truly successful commercially for high voltage surge arrester applications. Even under normal operating conditions, its electrical characteristics change after a relatively short time. Such a change can, in the case of a high voltage surge arrester, result in a catastrophic failure causing extensive damage to other components in the system, which the arrester is designed to protect.

SUMMARY OF THE INVENTION

In the present invention a metal oxide non-linear voltage-variable resistor of the type comprising silicon dioxide as an impurity comprises in addition thereto, the impurities barium oxide and boron oxide. The addition of the impurities barium oxide and boron oxide results in improved stability of the resistor.

PREFERRED EMBODIMENT OF THE INVENTION

Figure 1:
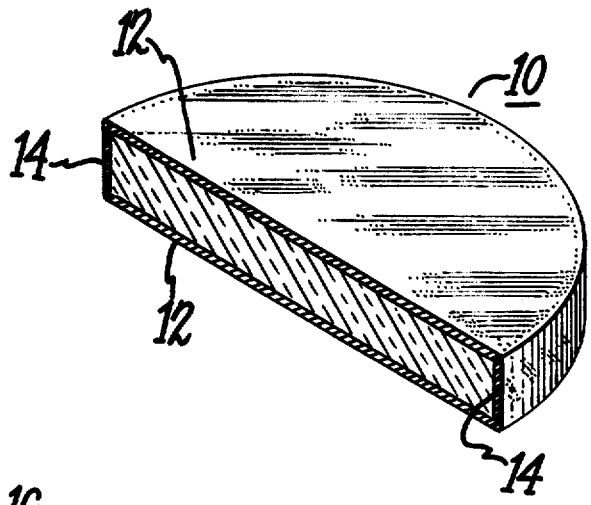
FIG. 1 shows a sectioned perspective of an arrester valve element of sintered material having a composition in accordance with a preferred embodiment of the invention.

A preferred embodiment of the invention is the surge arrester valve element disc 10 shown in FIG. 1. The disc 10 is a sintered body of zinc oxide compound provided on both faces with a contact layer 12 of silver, and also provided about the perimeter with an insulating coating 14 to prevent flashover.

The disc 10 is pressed from a powder having the following composition, in mole percent:

96.55 percent, ZnO (zinc oxide)
0.5 percent, $Bi_2O_3$ (bismuth trioxide)
0.5 percent, $Co_2O_3$ (cobalt trioxide)
0.5 percent, $MnO_2$ (manganese dioxide)
1.0 percent, $Sb_2O_2$ (antimony trioxide)
0.5 percent, $Cr_2O_3$(chromic oxide)
0.1 percent, $BaCO_3$ (barium carbonate)
0.1 percent, $B_2O_3$ (boron oxide)
0.25 percent, $SiO_2$ (silicon dioxide)

After the disc 10 is pressed into shape, it is sintered in generally the same way as are the more commonly used silicon carbide discs. The silver layers 12 and the anti-flashover collar 14 are applied in later steps. After sintering, the disc 10 is about 0.9 inch thick and about 2¾ inches in diameter. One or more of such discs 10 may then be incorporated in a surge arrester assembly, such as for instance in a surge arrester of the type rated at 258 kilovolts.

General Considerations

During the sintering process, the impurities are believed to form various reaction products. The precise nature and molar concentration of such products in the sintered disc is not presently fully understood. It does seem likely, for instance, that the barium carbonate reacts at the sintering temperature to form barium oxide. If this does in fact occur, then it seems also likely that the molar percentage of the barium oxide is nearly the same as that of the barium carbonate, from which it was formed. For this reason, the composition of the final sintered disc is given here in terms of the composition of the powder from which it was pressed, though it is recognized that conceivably the actual composition may vary slightly therefrom in molar percentages due to this formation of the reaction products. Also, some elements with a relatively low boiling temperature, such as bismuth, may well be partly lost by evaporation in the heating process so that the final composition after sintering can have as much as 25 percent less bismuth in it.

Figure 2:
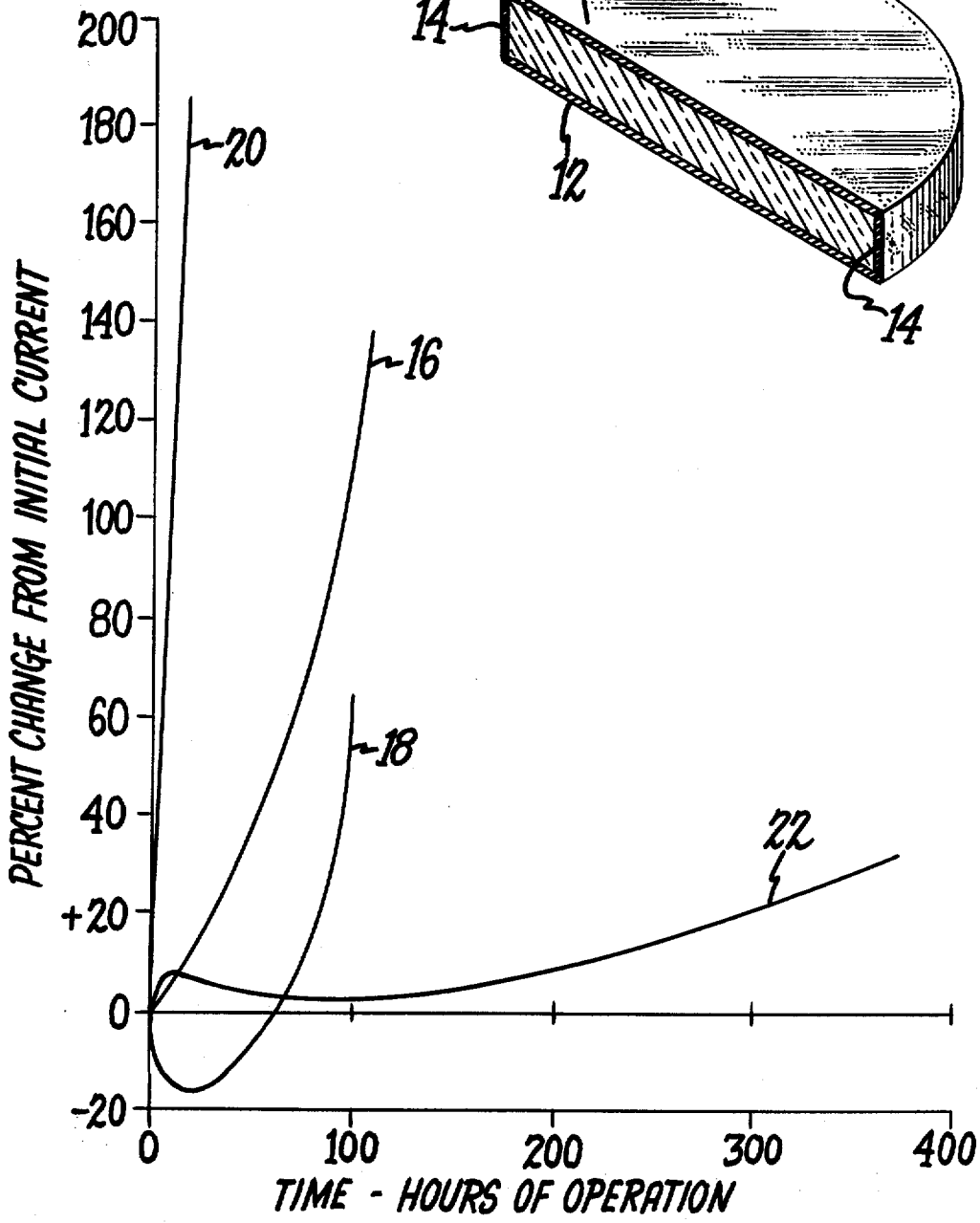
FIG. 2 shows the relative stabilities of prior art valve elements as compared to the valve element of FIG. 1.

A rough indication of the degree of improved stability that can be obtained by the addition of the impurities barium oxide and boron oxide to silicon oxide containing compositions as compared to their addition to compositions that do not contain silicon dioxide is given in the FIG. 2. The graph of FIG. 2 represents the percentage change in current of four different disc samples in a time interval during which they were subjected to conditions designed to approximate those under which they would operate in a surge arrester. The curves indicate only rough approximations of the actual valves of current during the time intervals.

Referring now to FIG. 2, the curve 16 shows generally the stability of a first sample disc pressed from a powder containing no silicon dioxide and having the following composition:

97.0 molar percent zinc oxide
0.5 molar percent bismuth trioxide
0.5 molar percent cobalt trioxide
0.5 molar percent manganese dioxide
1.0 molar percent antimony trioxide
0.5 molar percent chromic oxide For testing, the disc was placed in an oven in circulated air at 65° C. An alternating voltage of sufficient magnitude was applied across the disc to result in a relatively low initial current of 0.4 milliamperes per square centimeter through the disc, and this voltage was then held constant. The current was read as a function of time to determine the stability. It is seen from the curve 16 that the current rapidly increased during the first 100 hours, thus indicating rather poor stability.

The curve 18 in FIG. 2 shows generally the stability of a second disc sample made from a powder having the same composition as the sample for the curve 16, but in which a corresponding portion of the zinc oxide has been replaced by 0.1 molar percent of each of the impurities barium carbonate and boron oxide. It contains about 0.1 molar percent of each of the impurities barium oxide and boron oxide after sintering. This second sample was tested with an initial current of 0.12 milliampere per square centimeter under generally the same conditions as the first sample of curve 16. It can be seen from the curve 18 that the stability of the second sample was somewhat improved over the first sample, in that the current rose to a lower level during the first 100 hours, despite the higher initial current.

The curve 20 of FIG. 2 shows generally the stability of a third sample disc pressed from a powder having a composition which is the same as that for the first sample, except that 0.25 molar percent of the zinc oxide has been replaced by silicon dioxide. While this composition with silicon dioxide has a higher exponent than does the composition of the first sample, the stability of the third sample composition is not nearly as good. In fact, the stability of the third sample is so poor that in order to yield meaningful data, the initial current for it could only be brought to 0.03 millampere per square contimeters. It can be seen from the curve 20 that even at this low current, the stability of the third sample was very poor, the current rapidly increasing to over 150 percent during just the first 25 hours.

The curve 22 of FIG. 2 shows generally the stability of a fourth sample disc pressed from a powder having the same composition as the third sample, except that a corresponding portion of the zinc oxide has been replaced by 0.1 molar percent barium carbonate and 0.1 molar percent boron oxide. The sample was tested at the same initial current of 0.12 milliampere per square centimeters, as was the second sample. It is seen from the curve 22 that the improvement in the stability for the fourth sample, as compared to the third sample, is much greater than would be expected from the improvement that resulted in the second sample when the same impurities were added to the first sample composition. The reasons for the dramatic nature of the improved stability when barium carbonate and boron oxide are added to a silicon dioxide-containing zinc oxide powder for a sintered disc are not at this time fully understood.

It should be noted that the data on which the above curves are based is at this time necessarily limited, and the curves shown in the FIG. 2 are by no means presented as necessarily completely accurate for a large number of samples. However, the data is thought to be sufficiently representative to give a reasonable approximation of the stabilities of the various compositions for describing the present invention.

The addition of the impurities barium carbonate and boron oxide has been known to result in some improvement in stability when added to various other zinc oxide compositions. However, it has been assumed heretofore by those skilled in the art of zinc oxide resistor compositions for surge arrester valve elements that these impurities should not be added to a composition which contains silicon dioxide, as that would result in impaired electrical strength as well as degradation of other electrical characteristics. It has been found, however, that the addition of barium carbonate and boron oxide to a silicon dioxide-containing zinc oxide composition does not, in fact, necessarily result in significantly degraded characteristics, and at the same time does result in a surprising degree of improved stability. The degree of improved stability is much greater than that which results when the impurities barium carbonate and boron oxide are added to the other zinc oxide compositions.

While the disc of the preferred embodiment has a given specific composition, it is to be understood that the individual impurity contents of the disc may be varied to degrees known to those skilled in the art without departing from the spirit of the invention. The silicon dioxide may; for example, by only half of the concentration as given in the preferred embodiment.

The precise limits of concentration within which the amounts of barium carbonate and boron oxide may be varied are not presently determined, since rather extensive experimentation would be required to establish the limits with precision. However, at present it appears that one or both of these impurities may be present in a considerably lower concentration than that given in the preferred embodiment and still result in improved stability. There are some indications that if one or both of the barium carbonate and boron oxide are present in a concentration on the order of more than about 0.3 molar percent, the characteristics are likely to be degraded.

While the invention had been discussed herein in terms of a composition in which the metal oxide is zinc oxide, there is some reason to think that other metal oxides of somewhat similar nature, such as for example magnesium oxide, may also have improved stability under such operating conditions by the addition of the impurities as described herein. However, other metal oxides are not at this time being intensively investigated for such an application, and therefore not sufficient data is available at this time to indicate with certainty just how applicable the invention is to such other metal oxides for surge arrester uses.

We claim:

[1. A voltage-variable sintered body resistor composition of the type consisting mostly of zinc oxide and comprising a significant amount of silicon dioxide, wherein the improvement comprises that said composition also contains significant amounts of at least one of the impurities chosen from the group consisting of barium oxide and boron oxide.]

2. The composition defined in claim [1] *6* wherein the barium oxide is present to a concentration of on the order of 0.1 molar percent.

3. The composition defined in claim [1] *6* wherein the boron oxide is present to a concentration of on the order of about 0.1 molar percent.

4. The composition defined in claim [1] *6* and comprising additionally at least one impurity chosen from the group consisting of bismuth trioxide, cobaltic trioxide, manganese dioxide, antimony oxide, and chromic oxide.

5. The composition defined in claim 4 and comprising:

about [96.55] *96.55* molar percent zinc oxide,
about 0.5 molar percent bismuth trioxide,
about 0.5 molar percent cobaltic trioxide,
about 0.5 molar percent manganese dioxide,
about 1.0 molar percent antimony trioxide,
about 0.5 molar percent chromic oxide,
about 0.1 molar percent barium oxide,
about 0.1 molar percent boron oxide, and
about 0.25 molar percent silicon, dioxide.

*6. An improved zinc oxide varistor composition of the type containing silicon dioxide as an impurity the improvement which comprises:*

*the addition of an effective amount up to 0.3 molar percent each of barium oxide and boron oxide impurities.*

* * * * *